United States Patent [19]
Jolly

[11] Patent Number: 6,061,054
[45] Date of Patent: *May 9, 2000

[54] METHOD FOR MULTIMEDIA PRESENTATION DEVELOPMENT BASED ON IMPORTING APPEARANCE, FUNCTION, NAVIGATION, AND CONTENT MULTIMEDIA CHARACTERISTICS FROM EXTERNAL FILES

[75] Inventor: Bradford James Jolly, Longmont, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/792,237

[22] Filed: Jan. 31, 1997

[51] Int. Cl.[7] ................................ G06F 17/30; G06F 9/04
[52] U.S. Cl. ............................................. 345/302; 707/501
[58] Field of Search ..................................... 345/302, 342, 345/439, 131; 707/517, 501, 518

[56] References Cited

U.S. PATENT DOCUMENTS

| | | | |
|---|---|---|---|
| 5,367,621 | 11/1994 | Cohen et al. ............................. | 707/501 |
| 5,390,138 | 2/1995 | Milne et al. ............................... | 381/119 |
| 5,434,592 | 7/1995 | Dinwiddie, Jr. et al. ............... | 345/133 |
| 5,608,859 | 3/1997 | Taguchi ................................... | 345/302 |
| 5,613,057 | 3/1997 | Caravel ................................... | 345/302 |
| 5,640,560 | 6/1997 | Smith ...................................... | 707/104 |
| 5,652,714 | 7/1997 | Peterson et al. ........................ | 345/302 |
| 5,659,793 | 8/1997 | Escobar et al. ......................... | 345/302 |
| 5,666,542 | 9/1997 | Katai et al. .............................. | 345/302 |
| 5,751,283 | 5/1998 | Smith ...................................... | 345/342 |
| 5,752,029 | 5/1998 | Wissner ................................... | 345/302 |
| 5,801,686 | 9/1998 | Jurascheck et al. .................... | 345/342 |
| 5,809,244 | 9/1998 | Asai et al. ............................... | 709/217 |
| 5,815,151 | 9/1998 | Argiolas ................................... | 345/342 |
| 5,815,160 | 9/1998 | Kikuchi ................................... | 345/439 |
| 5,861,880 | 1/1999 | Shimizu et al. ......................... | 345/302 |
| 5,864,338 | 1/1999 | Nestor et al. ........................... | 345/302 |
| 5,878,421 | 3/1999 | Ferrel et al. ............................. | 707/104 |
| 5,953,524 | 3/1999 | Meng et al. ............................. | 395/701 |

FOREIGN PATENT DOCUMENTS

| | | | |
|---|---|---|---|
| 19507739 | 9/1996 | Germany ........................... | H04H 1/00 |
| 69400864 | 5/1997 | Germany ........................... | G06F 3/16 |
| 69221341 | 2/1998 | Germany ........................... | G09G 5/00 |

OTHER PUBLICATIONS

Schloss, Gerhard A. and Wynblatt, Michael J., "Presentation Primitives for the Layered Multimedia Data Model", Institute of Electrical nad Electronics Engineers Proceedings of the International Conference of Multimedia Computing, pp. 231–238, May 1995.

*Primary Examiner*—Mark R. Powell
*Assistant Examiner*—Jeffrey Allen Rossi

[57] ABSTRACT

A single-frame multimedia title contains all of the multimedia elements required for a given multimedia title or type of multimedia title. External Data Files, External Content Files, and External Program Files are stored external to the single-frame and are read into the single-frame when needed. Because data and content files are external to the single-frame, the single-frame has very limited or no linking requirements since the multimedia title does not require the association of any particular appearance, function, navigation, or content characteristics with multimedia elements in the single-frame. Also, the external storage of data, content, and programming files allows changes to the content of the multimedia title to be quickly and easily implemented by simply changing the appropriate External Data Files, External Content Files, or External Program Files, whether the changes be local or global in nature.

16 Claims, 1 Drawing Sheet

METHOD FOR MULTIMEDIA PRESENTATION DEVELOPMENT BASED ON IMPORTING APPEARANCE, FUNCTION, NAVIGATION, AND CONTENT MULTIMEDIA CHARACTERISTICS FROM EXTERNAL FILES

FIELD OF THE INVENTION

This invention relates generally to the display of information to a user of an electro-mechanical device or system, and more particularly to multimedia title development.

BACKGROUND OF THE INVENTION

Multimedia title development refers to the creation of computer software programs that typically include various combinations of text, graphics, photographs, audio, video, and other types of multimedia elements. A multimedia title, also known as a multimedia application, is a specific embodiment of one or more multimedia elements, in much the same way a book or article is an embodiment of a natural language such as English. A multimedia engine, also referred to as a multimedia software engine, is a software tool specifically designed to facilitate the creation of multimedia titles.

Multimedia titles are developed for many different applications. One common application for multimedia title development is the creation of Computer-Based Training (CBT) programs. CBT programs typically train a user about an activity or subject matter. For instance, a CBT program may teach a user about medieval art history and another CBT program may teach proper grammar. Other examples of multimedia title development applications include, but are not limited to, Electronic Performance Support Systems (EPSS), image, video and audio retrieval systems. EPSS applications typically are characterized as providing a "script" that is to be followed in performing an activity. Thus, an EPSS application may provide a script for helping a loan officer fill out a loan application or another EPSS application may provide a script to be followed by a telemarketer performing a telephone survey.

Any multimedia title has content characteristics, function characteristics, appearance characteristics, navigation characteristics, and screen resolution that must be defined. Content characteristics refer to the information embodied in the multimedia title that are conveyed to the user of the multimedia title through text, graphic, photographic, audio, and video multimedia elements. Function characteristics refer to the functionality of the multimedia title. Thus, function characteristics refer not only to the operations available to a user of the multimedia title, but also to the operations that are executed automatically for the user by the multimedia title with or without the user's knowledge. Examples of function characteristics known to the user include printing functions and user testing where the multimedia title inquires as to whether the user understood a concept being taught by the multimedia title.

In addition to content characteristics and function characteristics, a multimedia title has appearance characteristics, navigation characteristics, and screen resolution. Appearance characteristics refer to that which is generated by a multimedia title that can be perceived by the physical senses of a user during the execution of a multimedia title. Examples of visual appearance characteristics are what appears on the screen, image sizes, image locations, aspect ratios and colors. Audio appearance characteristics include, but are not limited to, volume and bass-to-treble ratio. Navigation characteristics of a multimedia title refer to the manner in which a user navigates or moves throughout the multimedia title. This includes, but is not limited to, navigating "forward" and "backward" through the multimedia title, jumping to a specific location, and ending the multimedia title. Screen resolution refers to the number of picture elements, or "pixels", on a computer screen. A screen resolution of "1024×768", for instance, means that the image on the screen comprises a grid containing 1,024 pixels per row and 768 pixels per column. Other common resolutions of personal computer screens include "640×480", "800×600" and "1280×1024".

Currently available tools or methodologies for the development of multimedia titles include Icon-based tools and Frame-based tools. An Icon-based tool or methodology is one in which the user creates, modifies and arranges symbols (icons) to create a multimedia title. Each symbol contains characteristics of the multimedia title, such as content and appearance characteristics of the multimedia title. There are relationships among icons that specify navigation and other characteristics. A Frame-based tool or methodology is one in which various characteristics of a multimedia title are encapsulated into collections, commonly known as "frames". Thus, a frame typically contains the function and appearance characteristics of a screen in the multimedia title. The frames of the multimedia title are connected with "links" between the frames that specify navigation characteristics. Referring to FIG. 1, frames and links according to a multimedia title of the prior art are shown.

Both Icon-based and Frame-based methodologies for developing multimedia titles are plagued by numerous disadvantages that have not been adequately addressed in the art. First, it is very difficult to change the function or appearance characteristics of a title late in the development phase because to do so would require changing a large number of icons, in the case of an Icon-based methodology, or a large number of frames, in the case of a Frame-based methodology. Due to this difficulty, Icon-based and Frame-based methodologies are inherently inflexible development tools after a certain point in the development process.

Second, developing a multimedia title using an Icon-based or Frame-based tool requires the selection of the screen resolution of the target screen on which the application is to be displayed. A multimedia title is developed for a screen having a certain screen resolution and thus the multimedia title is not readily transferable at the same proportion of a screen or window to a different screen resolution. Thus, if the multimedia title is developed for a target screen resolution of 640×480, for example, executing the multimedia title on a 1024×768 monitor reduces the size of the multimedia title to less than 40% of the area of the monitor, i.e. (640×480)/(1024×768). Changing the multimedia title to run at full size on a new screen resolution requires a substantial number of changes to existing frames and icons. For this reason, it is common practice to develop a new multimedia title at the lowest screen resolution on which the application might run. The lowest screen resolution will run smaller on a larger screen since the lowest screen resolution is representative of a smaller portion of the larger screen.

Third, a major shortcoming of traditional Frame-based or Icon-based multimedia development tools is that many changes to the content of a multimedia title cannot be made without access to the multimedia tool, whether it be a Frame-based or an Icon-based multimedia tool, used to develop the multimedia title. This is a cumbersome requirement, especially when one considers that a person interested in modifying the content of a multimedia title often is not the person who created the multimedia title and thus may have no idea how to use the requisite multimedia software engine to make desired content changes.

Fourth, both Frame-based and Icon-based methodologies require the explicit definition of linking and navigation characteristics on a frame-by-frame basis or an icon-by-icon basis. The requirement that linkages and navigation characteristics be explicitly defined for each and every frame or icon of a multimedia title is very tedious and thus time-consuming, and is inherently prone to human error. Just one error in specifying the linkages between frames or icons can render a portion of the multimedia title affected by linkage errors inoperable. Additionally, a long time is typically spent developing individual icons and frames and their relationships to each other. This effort must be reinvested for every new multimedia title that is developed. In this sense, development of icons and frames of multiple multimedia titles is a very inefficient process.

It is therefore an object of the present invention to be able to increase the class of global changes that can be made to frame appearance and operational characteristics after early stages in the multimedia title development process.

It is further an object of the present invention to be able to develop a multimedia title in one screen resolution and be able to run the multimedia title in another screen resolution while maintaining the same proportion of the screen or window in which the multimedia title is run.

It is still a further object of the present invention to be able to easily make changes to a larger class of content characteristics of a multimedia title without requiring changes be made with the multimedia software engine that was used to develop the multimedia title.

It is yet another object of the invention to solve the prior art problem of having to explicitly define linking and navigation characteristics in the tedious and error-prone manner required by traditional Frame-based and Icon-based methodologies.

It is still further an object of the invention to minimize the long multimedia title development times associated with traditional Frame-based or Icon-based methodologies.

It is yet another object of the invention to be able to readily make modifications to a multimedia title without access to the multimedia software engine used to create the multimedia title.

SUMMARY OF THE INVENTION

Therefore, according to the present invention, a single-frame multimedia title contains all of the multimedia elements required for a given multimedia title or type of multimedia title. External Data Files, External Content Files, and External Program Files are stored external to the single-frame and are read into the single-frame when needed. External Data Files contain the raw data required for controlling the appearance, function and navigation characteristics of the multimedia title. External Content Files are text, graphic, photographic, video, and audio files that are displayed by the multimedia title to the user and contain both information content and appearance characteristics of the multimedia elements of the multimedia title. External Program Files are used by the software engine to manipulate the External Data and Content Files.

Because data and content files are external to the single-frame, the single-frame has very limited or no linking requirements since the multimedia title does not require the association of any appearance, function, navigation, or content characteristics with multimedia elements in the single-frame. Also, the external storage of data and content files allow global changes to the content of the multimedia title to be quickly and easily implemented by simply changing the appropriate External Data Files and External Content Files.

The operation of the single-frame multimedia title first requires that the External Program Files of the single-frame multimedia title read data from the External Data files and store the data into memory. The single-frame multimedia title also reads in and processes the content of the External Content Files. Once the External Data Files and External Content Files have been read in and processed by the multimedia software engine, the user of the multimedia title is able to navigate through the title according to the data contents stored in memory.

The present invention offers important advantages over the prior art by providing the following capabilities: the ability to implement global changes to frame appearance and operational characteristics after early stages in the multimedia title development process; the ability to develop a multimedia title in one screen resolution and be able to run the multimedia title at the same proportion of the screen or window on which it runs in another screen resolution without extensive human intervention; the ability to make changes to the content of a multimedia title without requiring changes to be made with the multimedia software engine used to develop the multimedia title; the ability to not have to explicitly define linking and navigation characteristics in the tedious and error-prone manner required by traditional Frame-based and Icon-based methodologies; the ability to minimize the long development times associated with traditional Frame-based or Icon-based methodologies; and the ability to reduce the dependence upon the multimedia software engine used in developing the multimedia title in making modifications to a multimedia title.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawings, wherein:

DESCRIPTION OF THE INVENTION

The present invention describes a new methodology for creating and modifying a multimedia title in which the content, function, appearance and navigation characteristics of the multimedia title are separate from the frames and icons contained within the multimedia title. A single-frame contains all of the multimedia elements of a multimedia title that convey information to a user. Examples of multimedia elements include, but are not limited to, communications devices such as a button or box containing text, a graphics image, an audio clip, or video clip, and a scroll bar.

Figure 1:
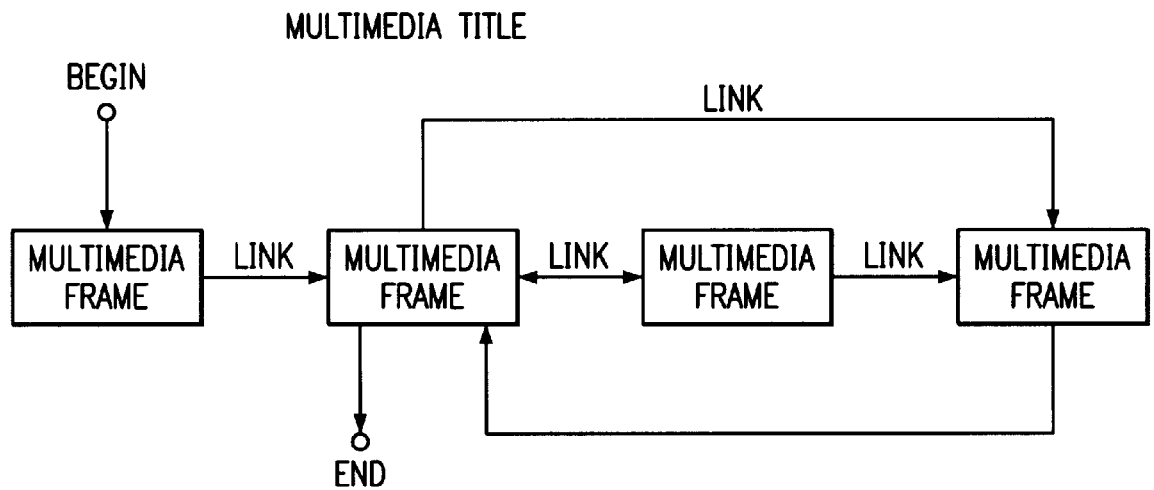
FIG. 1 shows frames and links of a multimedia title, according to the prior art.
Figure 2:
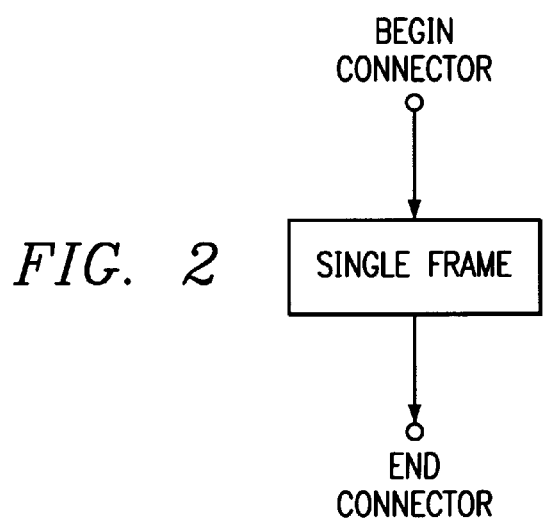
FIG. 2 shows the single-frame and limited links associated with a single-frame multimedia title, according to the present invention.

Unlike a traditional Icon-based or Frame-based multimedia title, the multimedia title of the present invention does not require the association of any appearance, function, or content characteristics with the multimedia elements or objects of the single-frame, since the appearance, function, navigation, and content characteristics of the multimedia title are stored external to the single-frame. Because there is no required association, or linking, between characteristics of the multimedia title with the multimedia elements, the only links required are for the beginning connector and the end connector of the multimedia title as shown in FIG. 2, and if the multimedia title has an implied beginning and end, there are no links at all.

The single-frame of the present invention uses information contained in External Data Files, External Content Files, and External Program Files that are stored external to the single-frame until needed. The External Data Files and External Program Files, separately or together, contain the information for controlling the appearance, function, and navigation characteristics of the single-frame multimedia title. These External Data Files may be simple text files or database files. Additionally, the External Data Files may themselves contain the names of External Content Files to which they are linked. In this sense, linking occurs external to the frame rather than inside the multimedia title, as is the case in the multimedia titles of the prior art. External Content Files are text, graphic, photographic, video, and audio files that are displayed by the single-frame. The External Content Files contain both the information content of the particular External Content File and the appearance characteristics of the multimedia elements within the multimedia title. The External Program Files contain C language code, or any other appropriate general purpose computer language code, used by the multimedia software engine to manipulate the External Data Files and the External Content Files.

The methodology of the single-frame multimedia title will now be described. A routine residing in an External Program File reads data from the External Data Files into memory. This data, together with External Program Files, represents all of the function, appearance, and navigation characteristics of the single-frame multimedia title. In particular, the data contains pixel-level screen resolution information that can be automatically scaled to any target screen resolution. The program for reading data may be a combination of C language code and object service language code capable of manipulating the multimedia elements of the single-frame multimedia title. It must be noted that while C language is specified, one skilled in the art will recognize that in addition to C language any general purpose computer language may be used. The information read from the External Data Files is typically read into the memory of the electro-mechanical device or system, such as a computer, on which the single-frame multimedia title is run.

As previously mentioned, the single-frame multimedia title uses a combination of a general purpose computer language, such as the C language code, and object service language code to manipulate the multimedia elements of the single-frame multimedia title and to control user interaction with the single-frame multimedia title. Quest for Windows™ by Allen Communication, Inc., for instance, is a commonly used multimedia authoring tool that has embedded C language capabilities. Either after or interspersed with reading data from the External Data Files, the External Program Files read in and process the content of the External Content Files. Processing the contents of the External Content Files may involve playing an audio clip, playing a video clip, scaling for screen resolution, or moving to an appropriate spot on the screen.

Next, after reading in the External Data Files and External Content Files to the single-frame multimedia title, the user navigates through the single-frame title according to the data stored in memory or according to the contents of the External Data Files. When the user clicks on a navigation button, or otherwise indicates a desire to move to a different part of the multimedia title, the single-frame multimedia title simply selects the appropriate items in memory representing that part of the title and processes them.

A major advantage of the single-frame multimedia title of the present invention is that it may be used for many different multimedia titles simply by importing the desired External Data Files and External Content Files to the title so long as the title contains all the multimedia elements required by the new External Data and Content Files. Thus, if a new title to be run is not much different from the title previously run in terms of multimedia elements used, very few if any modifications need to be made to the single-frame. If however, the single-frame is configured for a certain type of title, such as a pure text application, and a new type of title, for instance a graphics or video intensive application, is to be run, the multimedia elements or objects of the single-frame may need to be accordingly modified to accommodate the new application type. Even if it is the case that the multimedia elements of the single-frame must be modified, the present invention offers the advantage that it is easier to modify a single-frame than it is to modify the Frame-based or Icon-based title of the prior art. Because the data, contents, and programming of the title are stored external to the frame, only the multimedia elements need be modified and there are no links that have to be reconfigured.

In the above manner, the present invention simplifies global changes made to a multimedia title and thus ensures a consistent appearance for multimedia titles that use the single-frame approach. The present invention also greatly speeds up the development process. Global changes can be made to many different aspects of the title, including but not limited to, the position of the upper left and lower right corners of the title bar; the title font point size; the width and height of panel buttons; the position of buttons; the width, height, position, and font point size of subheadings; the width, height, position, and font point size for menu bars; the position of the upper left corner, width and height of default text location; the position of the upper left corner, width and height of default graphic location; names for buttons; names of graphic images used when panel buttons are "available" for clicking; names of graphic images used when panel buttons are "grayed out" and not available for clicking.

The present invention is useful in any application in which it is desired to display information to a user of an electro-mechanical device or system, such as a computer, laser disc, audio speaker, etc., in an organized fashion. As discussed, the present invention is particularly suited for multimedia title development and can be used in conjunction with any multimedia element or combination of multimedia elements. To this end, the present invention may be used with a multimedia title that is a text-only application or with a multimedia title having a combination of multimedia elements, such as video and graphics, audio, and text.

While the invention has been particularly shown and described with reference to a preferred embodiment, it will be understood by those skilled in the art that various changes in form and detail may be made therein without departing from the spirit and scope of the invention.

What is claimed is:

1. A method for creating a multimedia title, comprising the steps of:

storing all appearance, function or navigation data multimedia characteristics to be used by the multimedia title and all information content multimedia characteristics to be used by the multimedia title into one or more files external to the multimedia title; and reading and processing the appearance, function or navigation data multimedia characteristics and the information content multimedia characteristics for use by the multimedia title in accordance with one or more program files external to the multimedia title, wherein linkages are not explicitly defined for the multimedia title.

2. The method of claim 1, wherein the appearance, function or navigation data multimedia characteristics and the information content multimedia characteristics are read into a memory.

3. The method of claim 2, wherein the appearance, function or navigation data multimedia characteristics and the information content multimedia characteristics are read into the memory by a software engine that uses the one or more program files stored external to the multimedia title.

4. The method of claim 3, wherein the program file is comprised of C language.

5. The method of claim 3, wherein the program file is comprised of C language and a general purpose programming language.

6. The method of claim 3, wherein the program file is comprised of a general purpose programming language.

7. The method of claim 3, wherein the program file is comprised of one or more general purpose programming languages.

8. The method of claim 1, wherein after the step of reading, storing, and processing the appearance, function or navigation data multimedia characteristics and the information content multimedia characteristics, comprising the further step of:

navigating through the multimedia title according to one or more navigation data multimedia characteristics of the appearance, function or navigation data multimedia characteristics stored in the one or more files external to the multimedia title.

9. The method of claim 1, wherein after the step of reading, storing, and processing the appearance, function or navigation data multimedia characteristics and the information content multimedia characteristics, comprising the further step of:

modifying one or more of the appearance, function or navigation data multimedia characteristics or one or more of the information content multimedia characteristics and updating the one or more files external to the multimedia title in which all appearance, function or navigation data and all information content multimedia characteristics are stored.

10. The method of claim 1, wherein the multimedia title has one or more multimedia elements that comprise one or more of the following: text, graphics, photographs, audio, or video.

11. The method of claim 1, wherein the multimedia title is used in a Computer-Based Training (CBT) application.

12. The method of claim 1, wherein the multimedia title is used in an Electronic Performance Support System (EPSS) application.

13. A multimedia title system, comprising:

a multimedia title having one or more multimedia elements;

one or more files external to the multimedia title that contain all appearance, function or navigation data multimedia characteristics to be used by the multimedia title and all information content multimedia characteristics to be used by the multimedia title; and a program file external to the multimedia title that is used by a software engine to read and process the appearance, function or navigation multimedia characteristics and the information content multimedia characteristics into the multimedia title as needed, wherein an appearance, function or navigation data multimedia characteristic of the multimedia title may be changed by changing one or more appearance, function or navigation data multimedia characteristics of the appearance, function or navigation data multimedia characteristics stored in the one or more files external to the multimedia title and an information content multimedia characteristic of the multimedia title may be changed by changing one or more information content multimedia characteristics of the information content multimedia characteristics stored in the one or more files external to the multimedia title, wherein linkages are not explicitly defined for the multimedia title.

14. The system of claim 13, wherein the one or more multimedia elements comprises one or more of the following: text, graphics, photographs, audio, or video.

15. The system of claim 13, wherein the multimedia title system is used in a Computer-Based Training (CBT) application.

16. The system of claim 13, wherein the multimedia title system is used in an Electronic Performance Support System (EPSS) application.

* * * * *